United States Patent
Lambert et al.

(10) Patent No.: US 7,606,836 B2
(45) Date of Patent: Oct. 20, 2009

(54) METHODS FOR EFFICIENT DATA VERSION VERIFICATION

(75) Inventors: Mark L. Lambert, Menlo Park, CA (US); Michael J. Kanaley, Rio de Janeiro (BR)

(73) Assignee: TIBCO Software Inc., Palo Alto, CA (US)

( * ) Notice: Subject to any disclaimer, the term of this patent is extended or adjusted under 35 U.S.C. 154(b) by 92 days.

(21) Appl. No.: 11/468,753

(22) Filed: Aug. 30, 2006

(65) Prior Publication Data

US 2008/0046869 A1   Feb. 21, 2008

Related U.S. Application Data

(60) Provisional application No. 60/823,068, filed on Aug. 21, 2006.

(51) Int. Cl.
*G06F 17/00*   (2006.01)

(52) U.S. Cl. .................. 707/104.1; 707/101; 707/102; 707/103 R; 707/202; 707/203; 707/204; 707/205

(58) Field of Classification Search ............... 707/1–10, 707/100–104.1, 200–206
See application file for complete search history.

(56) References Cited

U.S. PATENT DOCUMENTS

2003/0005169 A1   1/2003   Perks et al.

OTHER PUBLICATIONS

PCT/US07/074582, Search Report and Written Opinion of International Searching Authority mailed Jun. 24, 2008.

*Primary Examiner*—Isaac M Woo
(74) *Attorney, Agent, or Firm*—Baker & McKenzie LLP

(57) ABSTRACT

Methods for efficiently determining and managing version information associated with sets of data objects, persistently storing the version information, and utilizing the stored version information to determine compatibility between the sets of data objects and applications performing operations utilizing the sets of data objects.

5 Claims, 5 Drawing Sheets

METHODS FOR EFFICIENT DATA VERSION VERIFICATION

FIELD

The present application relates to methods for efficient data version verification, and more particularly to methods for determining and managing version information associated with sets of data objects, persistently storing the version information, and utilizing the stored version information to determine compatibility between the sets of data objects and applications performing operations utilizing the sets of data objects.

BACKGROUND

Various methods have been utilized for managing compatibility of data and applications, typically utilizing single version numbers that are attached to individual elements. Conventional methods, however, have multiple disadvantages.

For instance, in the context of serialization in the Java programming language, each class may be given a version, whereby the version is written when a class instance is serialized. Thereafter, before an instance is read, the associated version is read, and when the versions do not match, the application cannot read the instance. In this method, as the version information is not stored independently from the serialized data, the application cannot determine whether a serialized object may be read unless the application attempts to serialize the object and fails. Additionally, in a graph of objects each object is associated with its own version information; therefore, when an upstream node cannot be read, no information is available regarding an ability to read downstream nodes. Furthermore, as groups of related classes frequently upgrade simultaneously to the same version, serialized instances of those groups will often contain redundant version information.

Another conventional method for managing compatibility includes using a single-store version, whereby data are stored along with a number indicating a format of the data. Prior to reading any of the stored data, an application compares the format number against a format number associated with the application. The data are allowed to be read only when the numbers match. In the single-store version method, however, when a wide variety of instances are stored a single version number must be changed when any of the classes change. This renders the number effectively useless unless the store is specialized for a particular application. Furthermore, a single version number does not convey adequate information regarding which classes have changed.

Accordingly, a need exists for methods for efficiently determining and managing version information associated with sets of data objects, persistently storing the version information, and utilizing the stored version information to determine compatibility between the sets of data objects and applications, while avoiding the above-mentioned disadvantages.

SUMMARY

An aspect of the present application provides for a method for serializing data, comprising determining closure information associated with at least one model class instance, the closure information including version information, generating read-compatibility requirement information for the at least one model instance, generating write-compatibility policy information for the at least one model instance, serializing a meta-data artifact, the meta-data artifact including the closure information, the version information, the read-compatibility requirement information, and the write-compatibility policy information, and serializing the at least one model class instance.

A further aspect of the present application provides for a method for deserializing data by an application, comprising constructing a registry, the registry including at least identification information associated with one or more known models and version information of each of the one or more known models, reading a meta-data artifact, the meta-data artifact containing at least one of version information, ignore policy information, or upgrade information associated with at least one model, determining whether the at least one model is known to the application based on the registry, when the at least one model is known to the application, comparing the version information associated with the at least one model with version information associated with the application, determining whether the version of the at least one model and the version of the application are compatible, based on a result of the comparison, when the version of the at least one model and the version of the application are compatible, marking all classes of the at least one model as deserializable, when the version of the at least one model and the version of the application are not compatible, determining whether instances of the at least one model are ignorable based upon the ignore policy information, and when the instances of the at least one model are ignorable, marking all classes of the at least one model as absent and ignorable.

A further aspect of the present application provides for a method for deserializing data by an application, comprising determining whether at least one model containing at least one model class instance is known to the application based upon information contained in a meta-data artifact, the meta-data artifact information including at least one of version information, ignore policy information, or upgrade information associated with the at least one model, determining whether the at least one model is ignorable, based upon the meta-data artifact information, and when the at least one model is not known to the application and the at least one model is ignorable, marking all references to the at least one model class instance as unresolved.

A further aspect of the present application provides for a method for serializing data by an application, comprising identifying at least one model class instance to be written, the at least one model class instance belonging to at least one model, reading a meta-data artifact, the meta-data artifact containing information including at least one of version information, ignore policy information, or upgrade information associated with the at least one model, determining whether the at least one model class instance was previously written using a model having a version equal to a version of a model used by the application, based upon the meta-data artifact information, and when the at least one model class instance was previously written using a model having a version equal to a version of a model used by the application, serializing the at least one model class instance.

BRIEF DESCRIPTION OF THE DRAWINGS

Embodiments of the present application are illustrated by way of example in the accompanying figures, in which like reference numbers indicate similar elements, and in which.

DETAILED DESCRIPTION

Figure 1:
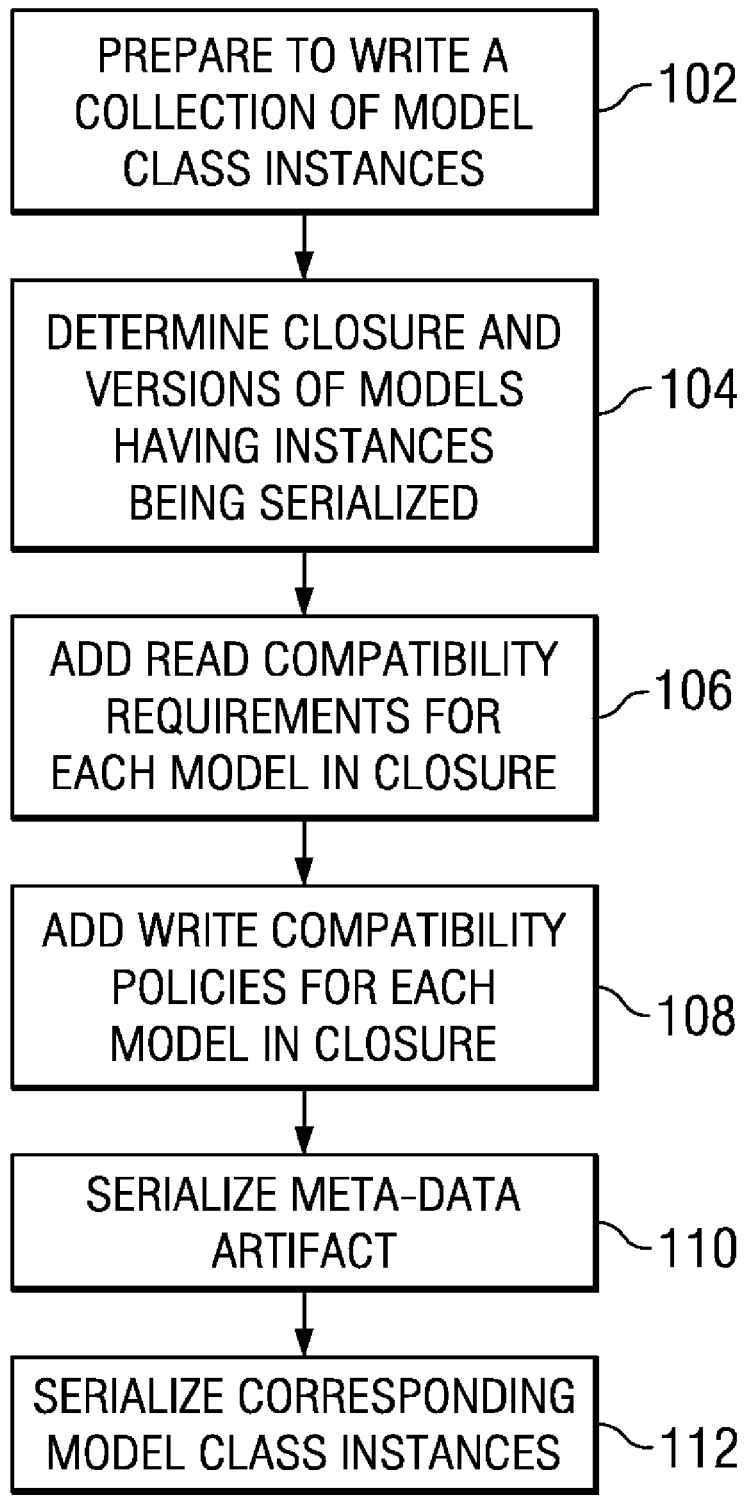
FIG. 1 is a flow diagram showing a process for creating meta-data on serialization according to an exemplary embodiment of the application.

The exemplary embodiments of the present application relate to methods for efficiently determining version information of sets of data objects, writing that version information to a persistent store, and using the written version information to determine store compatibility with running applications desiring to access the store.

The methods of the present application may include, for instance, storing meta-data at a model level rather than at an individual class instance level. The meta-data may be complex and may include structure in addition to an unique identifier. The meta-data may be used to express required capabilities to applications desiring to deserialize associated data, including for example, a level of software required by the application to deserialize a model's class instances, whether parts of the serialized data may be ignored by applications lacking necessary software to interpret the models, whether parts of the serialized class instances may be converted into a self-describing form when the application lacks the necessary software to deserialize the instances into particular data structures associated with their classes, how the application may obtain software necessary to deserialize parts of the data it is otherwise incapable of deserializing, and the like.

The meta-data may additionally be used to express required behavior to applications wishing to serialize associated data, including for instance, whether the application is allowed to modify incompatibly, and then over-write, data structures from various models it has deserialized, whether the application is allowed to modify incompatibly and make a separate copy of, data structures from various models it has deserialized, and the like.

As will be understood by one skilled in the art, the methods of the present application may be practiced in association with one or more computer systems, and the computer systems may each include one or more processing units, storage devices, input/output peripherals, displays, communication networks, and software programs and/or routines stored in the storage devices and executed by the processing units. Each software program and/or routine may be capable of performing communication with software programs and/or routines stored in and running on the same or on other computer systems, in conjunction with conventional computer communication hardware and software. The software programs and/or routines may be stored within the one or more storage devices of the computer systems, or may be accessed remotely, for instance via a communication network. The computer systems may include a plurality of individual components networked or otherwise linked to perform collaboratively, or may include a single, stand-alone device having physically-integrated components. The components of the computer systems may include and may be included within fixed and portable devices including desktop devices, laptop devices, server devices, terminal devices, personal digital assistant devices, smart phone devices, television devices, radio devices, audio and video recording devices, and the like.

As referred to above, the methods of the present application allow applications to enhance data sharing by using meta-data that define and manage data compatibility. The meta-data may include, for instance, version information. The meta-data may be operable to define policies for read-compatibility and/or write-compatibility of the data, at a model level, as described in detail below.

The applications may share and/or store data in one or more external resources while preserving compatibility amongst applications with different versions of the programs that represent and manage the shared data. The external resources may include, for example, one or more of a structured query language relational database management system ("SQL RDBMS"), an Extensible Markup Language ("XML") file, an archive such as a Java archive ("JAR") file, a network protocol, and the like.

Models may each contain a set of elements such as related object classes, and each model may be associated with version information, such as version number information. One or more class instances may belong to a single model or to a plurality of different models. For instance, a first class and a second class may be from different models, and an instance of either the first class or the second class may belong to both models.

In an exemplary embodiment, for instance, a model may include a unique identifier and a version description to differentiate between different versions of the same model. The model may additionally include software that defines in-memory data structures for each object class in the model, and may utilize software operable for reading and writing instances of each class, converting the instances to one or more external formats through serialization, and converting the instances from the external formats to internal data structures through deserialization.

In an exemplary embodiment, serialization may include writing out one or more sets of in-memory information in a format suitable for exporting to a storage medium such as a database, a file, a memory buffer, and the like, or for transmission of the information across a network connection link, either as a series of bytes or in some human-readable format such as XML. Deserialization may include an operation substantially opposite to that of serialization, whereby a data structure is extracted from a series of bytes in the particular formats.

The software utilized by the model may be internal to the model, or may be external software accessed by the model. The external software accessed by the model may reside and/or run on the same system as the model, or may be remotely located and accessible via a network communication link. The model may additionally include meta-data that describe how to perform the serialization and deserialization operations.

In an exemplary embodiment, a quantity of models may be an order of magnitude smaller than a quantity of classes, where each class having instances to be persisted may belong to a model. Any change performed to any class contained in the model may result in a corresponding change to the version information associated with the entire model.

When a graph of class instances is to be persisted, a version closure may be constructed, and the version closure may include version information associated with each model to which the graph nodes belong.

In an exemplary embodiment, for instance, the version closure construction may be performed using a registry that binds models to the classes contained in those models, in addition to meta-data that may allow traversal of model class graphs. The constructed closure may then be persisted along with the graph.

Thereafter, as described in greater detail below, a second application may construct a second version closure based on the classes currently in its own address space, and compare the second version closure with the version closure in the persistent store. The second application may determine whether it is capable of reading the persisted data, based on a result of the comparison. Furthermore, when the second application is not able to read the persisted data, it may determine what migration steps may be taken in order to be able to read the data successfully, based on a result of the comparison.

In an exemplary embodiment, a group of class instances may belong to one or more models, and may be connected through various property references into a graph. When serializing the graph, the graph may be scanned to identify a spanning set of the models to which the graph members belong. A meta-data structure may then be created based on that set of models, and the structure may be associated with the serialized class instances. The meta-data artifact may then be used for a variety of purposes associated with reading the serialized class instances back into memory by other applications, and class instances may be re-serialized after modifying them in memory.

The meta-data may be stored at a model level rather than, for instance, at an individual class instance level. The meta-data may include a complex set of information including information in addition to or in substitution of a unique identifier representing a data structure version.

The meta-data may be utilized to express required capabilities to applications desiring to deserialize the associated data. The required capabilities may include, for instance, a required version level of software the application needs in order to deserialize class instances of a particular model; whether and/or when one or more parts of the serialized data may be ignored by applications lacking necessary software to interpret the models including those parts; whether and/or when one or more parts of the serialized class instances may be converted into a standard self-describing form when the application lacks necessary software to deserialize the instances into particular data structures associated with their classes; how the application can obtain any software necessary to deserialize those parts of the data it is currently incapable of deserializing, and the like.

The meta-data may additionally be utilized to communicate required behavior to applications desiring to serialize the associated data. Such behavior may include, for instance, whether and/or when an application is allowed to modify data structures from various models it has deserialized and then over-write the modified data structures; whether and/or when an application is allowed to modify incompatibly, and thereafter make a separate copy of data structures from various models it has deserialized, and the like.

Definition and utilization of meta-data at the model level may allow for aggregation of operations performed with respect to elements of the model. In an exemplary embodiment, for instance, version information may be attached to a model containing a plurality of classes. Therefore, subsequent modification of the version information of the model may correspond to associated changes with respect to each of the classes of the model, avoiding a need to individually modify version information for each of the plurality of classes.

Additionally, definition and utilization of meta-data at the model level may allow application of read-capability and write-compatibility features and/or policies to logical groupings of classes, thereby facilitating simplification of compatibility definitions.

The model-level meta-data may be used to determine compatibility requirements for applications requesting to read and understand serialized data, and in updating those data consistent with a compatibility policy. The meta-data may be oriented to maintenance of read compatibility by describing capabilities required of the reading application in order to successfully deserialize the model data.

In an exemplary embodiment, for instance, a model may include a unique identifier and a read compatibility indicator describing the model version or versions that must be understood by any application attempting to read the serialized data. Additionally, the model may include version information, for example in the form of {A, B, C}, where A may correspond to a "major version", B to a "minor version", and C to a "bug fix version." As will be understood by one skilled in the art, the above-identified form of the version information is merely exemplary, and a large variety of suitable version information forms and structures may be utilized.

When an application serializes class instances of the model, the application may compute the set of all models to which the serialized class instances belong, and create meta-data including the model's unique identifier, the version used to serialize, and the read compatibility indicator. The created meta-data may then be attached to the serialized data, for instance by prepending, appending, or otherwise integrating the meta-data to a file or archive, by storing the meta-data in a table in a database, and the like.

The reading application may compare loaded models of the application with the list of models in a meta-data artifact associated with serialized model class instances. In an exemplary embodiment, for instance, when an application desires to read the serialized data, it may first read the meta-data, and then compare the list of required models against the models to which it has access.

The application may identify models in a plurality of ways, depending upon a type of the application. For instance, when the application is a Java application, it may scan resources from its class path to look for special resources that identify model artifacts and their associated information. When the application is a C++ application, it may look in a predetermined location for dynamic-load model libraries. When the application is a web application, for instance a web application deployed into a Java 2 Platform, Enterprise Edition ("J2EE") container, it may scan resources in an associated web archive ("WAR") to look for special resources that identify model artifacts and their associated information.

The application may then proceed to compare the versions of those models used to create the serialized data against the versions the application has access to and is capable of understanding. For instance, newer versions of a model may have functionality such as additional and/or supplemental classes or properties, whereby applications having earlier software may not be able to understand serialized instances that use the newer functionality. The meta-data may therefore contain a version compatibility indicator that the reading application may use to decide whether the application's version of the model software is capable of reading the serialized data.

In an exemplary embodiment, for instance, a model may have a version of 3.2.1. The model may additionally have a compatibility indicator requiring that the reading software have a matching major version, and a minor version that is greater than or equal to the meta-data's minor version. The reading application may therefore determine whether it is capable of reading the serialized data by comparing the version of the application's model against the version of the meta-data. If the application's version is, for example, 3.2.2, or 3.4.5, the application may read the data. In contrast, if the application's version is, for example, 3.1.10, it cannot read the data.

When one or more models contained in the meta-data are not known to the reading application, or contain serialized class instances that the reading application is not able to understand, the reading application may construct a view of the serialized data that excludes and/or ignores information that the application does not understand. Additional state information may be included in the meta-data, and the state information may include, for instance, ignore policy information. The state information may be used to mark or identify various models as being optional or required.

The state information may be utilized in construction of the view. For instance, models identified as optional may be ignored in the view, whereas models identified as required may not be ignored. The reading application may additionally utilize compatibility features as described above, whereby incompatible models may be treated as missing models for the purpose of the view construction.

Another use of the optional or required state information in the meta-data may include allowing the reading application to perform a conversion of the serialized data into another format such as a universal data format and/or a generic data format (e.g., a set of property name and/or value pairs, or a standard tree format such as Document Object Model ("DOM")). The deserialized graph of model class instances may include a combination of model data structures for instances whose models are known to the reading application, and generic data structures for instances whose models are not known to the reading application or that are incompatible with the reading application.

In an alternative exemplary embodiment, when a reading application cannot read one or more parts of the data through analysis of the meta-data associated with serialized model class instances, it may obtain compatibility with the serialized data. The reading application may produce a list of the models unknown to it by analyzing the meta-data, along with any known, but version-incompatible, models. The meta-data may contain additional information describing methods to obtain and/or utilize model software necessary to read the data that are unreadable. In an exemplary embodiment, the additional information may include upgrade information.

The additional information may include, for instance, a Uniform Resource Locator ("URL") pointing to a model artifact. For example, a Java web application may utilize the URL to download and add to its class loader, or a C++ program may download and add to its address space as a dynamic-link library.

As described above, the meta-data may be utilized in maintaining read compatibility, and may describe a state of serialized data in terms of models containing class instances, versions of the models, compatibility indicators, view construction indicators, and information describing methods to obtain and/or utilize software required to read the model. The meta-data may additionally be extended with policies directed to maintenance of write compatibility. A policy may control and/or describe an ability of an application to update data that have been read, and to subsequently serialize the read data back to an original location.

In an exemplary embodiment, for instance, serialized data for a model may reside in a database having a version of 1.0.0. An application may have software capable of reading models having versions of 2.0.0 and older. The application may thereby read data for the model from the database and enhance it with additional properties that are defined in version 2.0.0 of the model, but that are not available in version 1.0.0. After enhancement, the application may desire to return the updated data to the database. Such an update may cause any reading applications with software that reads models at version 1.0.0 or older to malfunction and/or break, as such an application (reading models at 1.0.0 or older) would not be able to interpret the updated information contained in the newer version (2.0.0) of the model. Therefore, a policy may be created in the meta-data that prevents applications from enhancing the data that has been read.

Alternatively, the policy may prevent applications from enhancing data that have been read and serializing the read data to an original location, instead requiring that enhanced data be duplicated or copied and stored in a location other than the original location. That is, the policy may permit enhancement of a copy of the read data, while preventing overwriting of the original data with enhanced data.

Additional policies may be included in alternative exemplary embodiments. Such policies may include, for instance, policies preventing any copying, policies permitting selective copying and/or overwriting based upon version information, and policies permitting updates to copies or originals only so long as no incompatible information is added.

A process for creating meta-data on serialization of data will now be described with reference to FIG. 1. The process 100 may begin by preparing to write a collection of model class instances, at step 102. Thereafter, the closure of models whose instances are being serialized, together with their versions, may be determined at step 104. The closure of models may include a set of high-level instructions indicating what an application is required to do to read the data, for instance, downloading of additional software, transforming the data, ignoring one or more unreadable parts of the data, and the like.

At step 106, read compatibility requirements including, for example, a compatibility indicator, an ignore policy information such as an optional or required indicator, upgrade information, and the like, may be added for each model in the closure. Write compatibility policies, such as update policies, overwrite policies, and the like, may be added for each model in the closure, at step 108. Thereafter, the meta-data artifact containing above information may be serialized at step 110, and the corresponding model class instances may be serialized at step 112.

Figure 2:
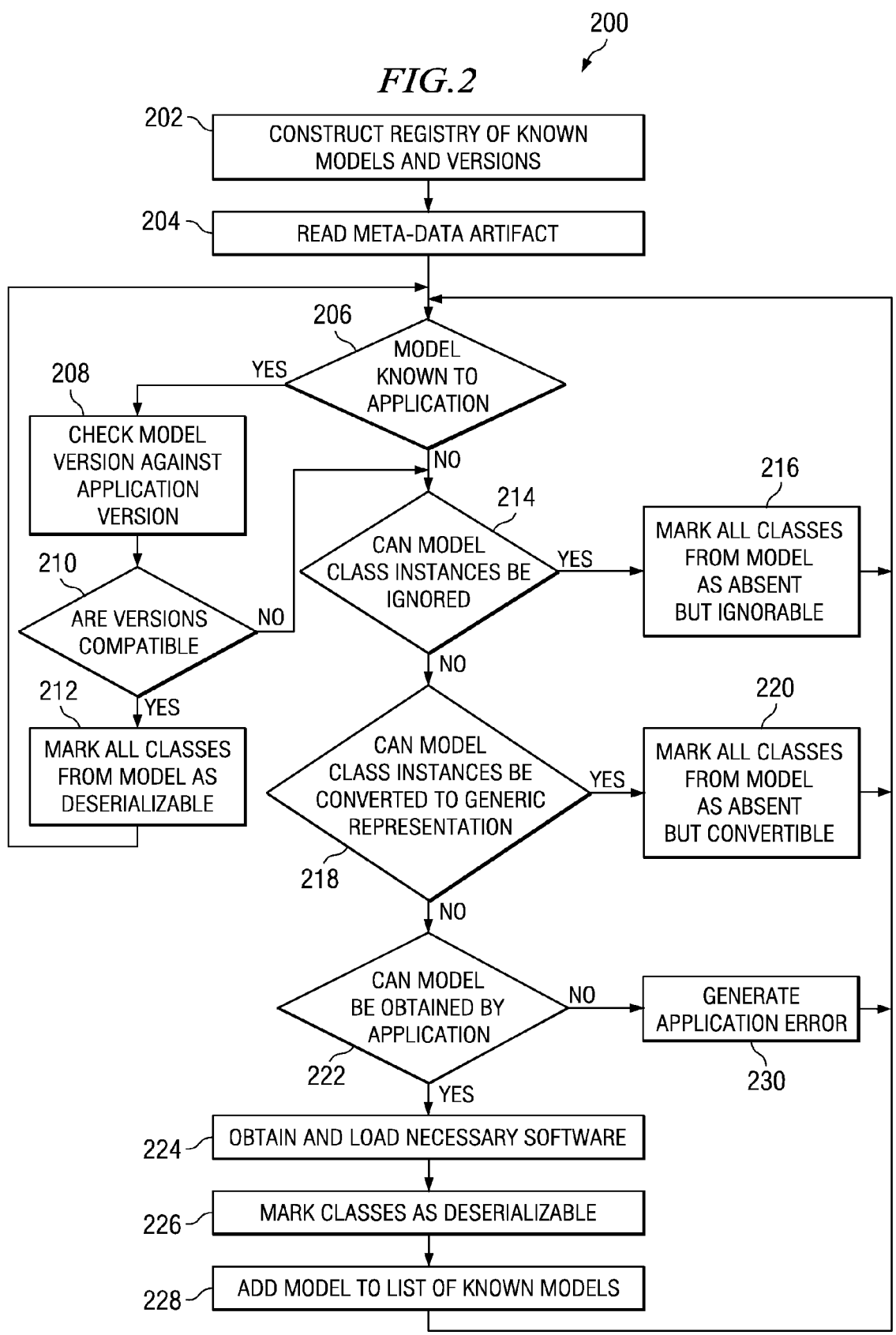
FIG. 2 is a flow diagram showing a process for reading meta-data on deserialization according to an exemplary embodiment of the application.

Referring now to FIG. 2, a process for reading meta-data on deserialization will be described. A registry of known models and their versions may be constructed at step 202, and a meta-data artifact may be read at step 204. Thereafter, for each model in the meta-data closure, the following steps may be performed.

Whether the present model is known to the application may be determined at step 206. When the model is known to the application, process 200 may proceed to step 208, where the version of the meta-data's model may be compared with and/or checked against the application's version. After the version of the meta-data's model is checked against the application's version, whether the versions are compatible in accordance with the model's compatibility indicator may be determined at step 210. When the versions are compatible, the process 200 may continue to step 212, where all classes from the model may be marked as deserializable. When the versions are not compatible, the process 200 may proceed to determine whether model class instances may be ignored, at step 214.

When the model is determined not to be known to the application at step 206, the process 200 may continue to step 214, where whether the model's class instances may be ignored in accordance with the meta-data's ignore policy for that model may be determined. When the model's class instances may be ignored, all classes from the model may be marked as absent, but ignorable, at step 216. When the model's class instances may not be ignored, the process 200 may proceed to step 218, where a determination may be made whether the model's class instances may be converted to a generic representation.

When the model's class instances may be converted to a generic representation, all classes from the model may be marked as absent, but convertible, at step 220. When the model's class instances may not be converted to a generic representation, the process 200 may continue to step 222, where whether the model can be obtained by the application using information in the closure may be determined.

When it is determined that the model may be obtained using information in the closure, the process 200 may continue to step 224, where any necessary software may be obtained and/or loaded. Thereafter, all classes from that model may be marked as deserializable, at step 226, and the model may be added to the list of those known to the reading application at step 228.

When the model cannot be obtained at step 222, the process 200 may proceed to step 230, where an application error stating that the model's class instances cannot be deserialized may be generated.

Figure 3:
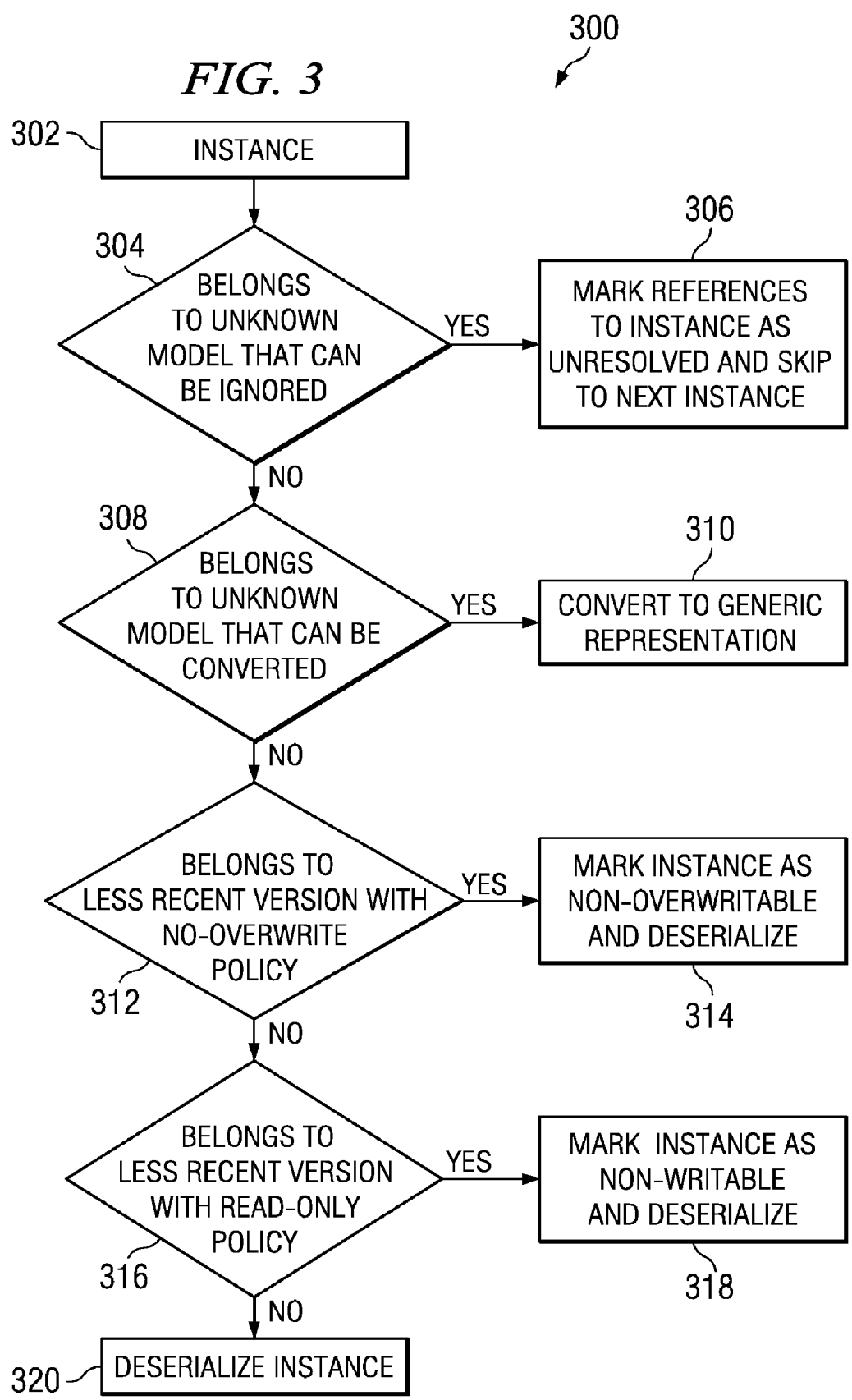
FIG. 3 is a flow diagram showing a process for deserializing instances according to an exemplary embodiment of the application.

When all models in the closure have been verified, deserializing of the model class instances may be performed. With reference to the exemplary process shown in FIG. 3, a deserialization process 300 is performed for each instance encountered.

The process 300 may begin with each instance, at step 302, and a determination of whether the instance belongs to an unknown model that can be ignored at step 304. When the instance belongs to an unknown model that can be ignored, any references to the instance may be marked as unresolved due to an unknown model, and the process may continue to consideration of a next instance, at step 306.

When the instance does not belong to an unknown model that can be ignored, the process 300 may continue to step 308, where whether the instance belongs to an unknown model that can be converted to a generic representation may be determined. When the instance belongs to an unknown model that can be converted to a generic representation, the instance may be converted to a generic representation, at step 310.

When the instance does not belong to an unknown model that can be converted to a generic representation at step 310, whether the instance belongs to a known model of a less-recent version, and has a no-overwrite policy, may be determined at step 312. When the instance belongs to a known model of a less-recent version, and has a no-overwrite policy, the instance may be marked as not being able to be overwritten or serialized back to the same location, and the instance may be deserialized, at step 314.

When the instance does not belong to a known model of a less recent version, and does not have a no-overwrite policy, whether the instance instead belongs to a known model of a less recent version, and has a read-only policy, may be determined at step 316. When the instance belongs to a known model of a less-recent version, and has a read-only policy, the instance is marked as not being writable at all, and the instance may be deserialized, at step 318.

When it is determined that the instance does not belong to a known model of a less-recent version, and does not have a read-only policy, the instance may be deserialized at step 320.

The process described above is merely exemplary, and it is to be understood that the reading application can interpret closure meta-data in various ways. Capability mismatches may also be determined and/or evaluated using a plurality of methods. For instance, a wide variety of processes may be utilized in determining whether to upgrade incompatible models, download missing models, ignore missing and/or incompatible models, convert classes of missing and/or incompatible models into generic representations, generate errors, and the like. Furthermore, it should be understood that the capability descriptions described above are merely exemplary. A plurality of capability descriptions in the meta-data may be available, and additional capability descriptions may be utilized in accordance with the methods of the present application.

As described above, an application may desire to enhance a set of model class instances with one or more new properties after reading. For instance, the application may desire to enhance a set of instances when the application uses a model having a version more recent than the model used to originally write the data that have been read. Such enhancements may be governed by write-compatibility meta-data.

Figure 4:
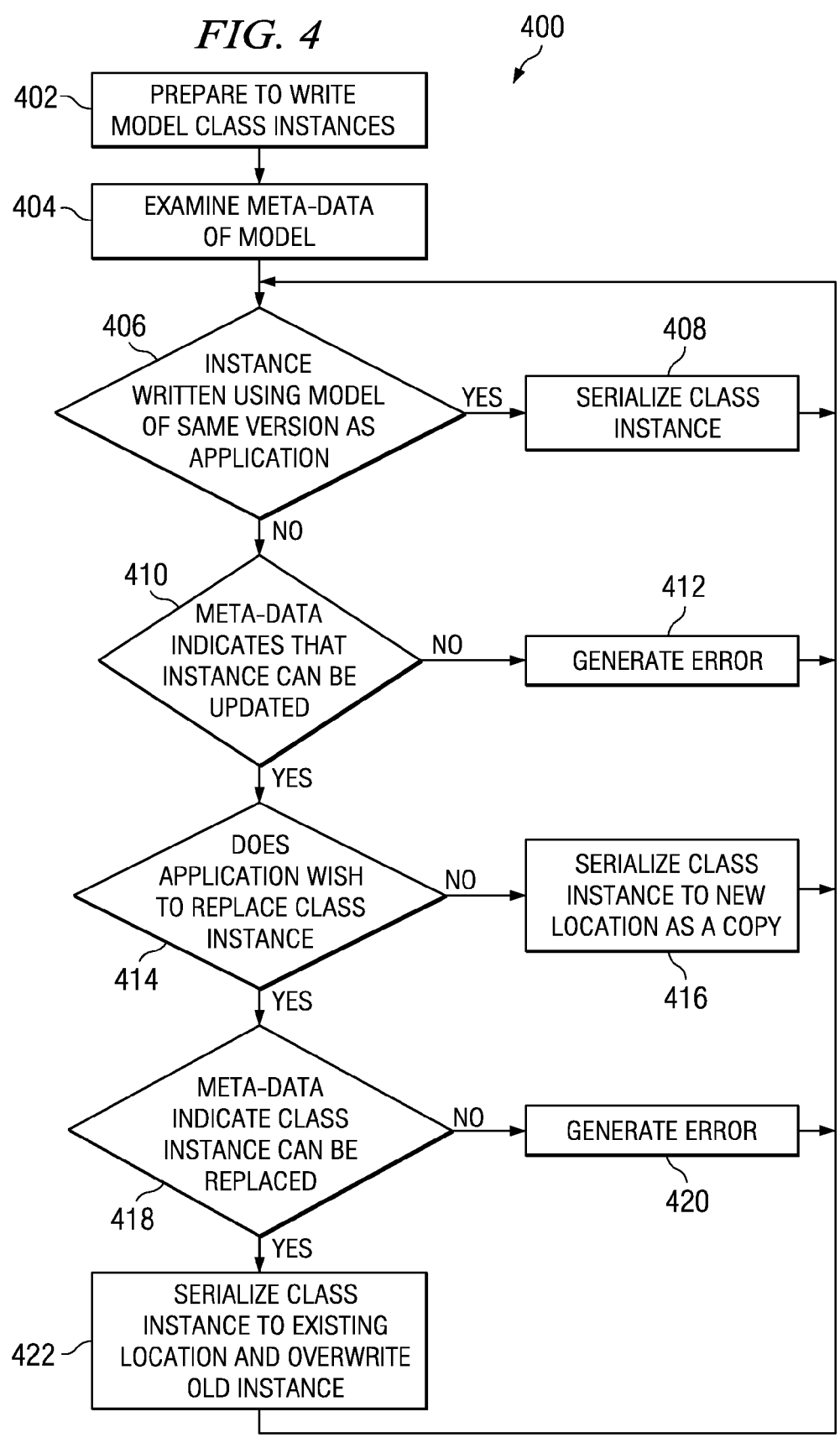
FIG. 4 is a flow diagram showing a process for using meta-data on serialization according to an exemplary embodiment of the application.

An exemplary process 400 for use of the meta-data by a writing application is now described, with reference to FIG. 4. Process 400 may begin by preparing to write model class instances at step 402, for instance by identifying and/or determining one or more model class instances to be written, and examining meta-data of the model to which a present class instance belongs, at step 404.

At step 406, whether the class instance was originally written using a model having a version equal to the model being used by the application may be determined. When the model versions are equal, the class instance may be serialized, and the process may proceed to the next class instance, at step 408.

When the versions are not equal, the process may continue to step 410, where it is determined whether the meta-data indicate that the class instance can be updated. When the class instance cannot be updated, an error may be generated at step 412. When the class instance can be updated, whether the application desires to replace the class instance (i.e., write the class instance back in place) may be determined at step 414.

When the application desires to replace the class instance, the class instance may be serialized to a new location as a copy, and the process may continue to the next class instance, at step 416. When the application does not desire to replace the class instance, whether the meta-data indicate that the class instance can be replaced may be determined at step 418. When the meta-data indicate that the class instance cannot be replaced, an error may be generated, and the process 400 may continue to the next class instance, at step 420.

When the meta-data indicate that the class instance can be replaced, the class instance may be serialized back to an existing location overwriting the old class instance, and the process 400 may continue to the next class instance, at step 422.

Figure 5:
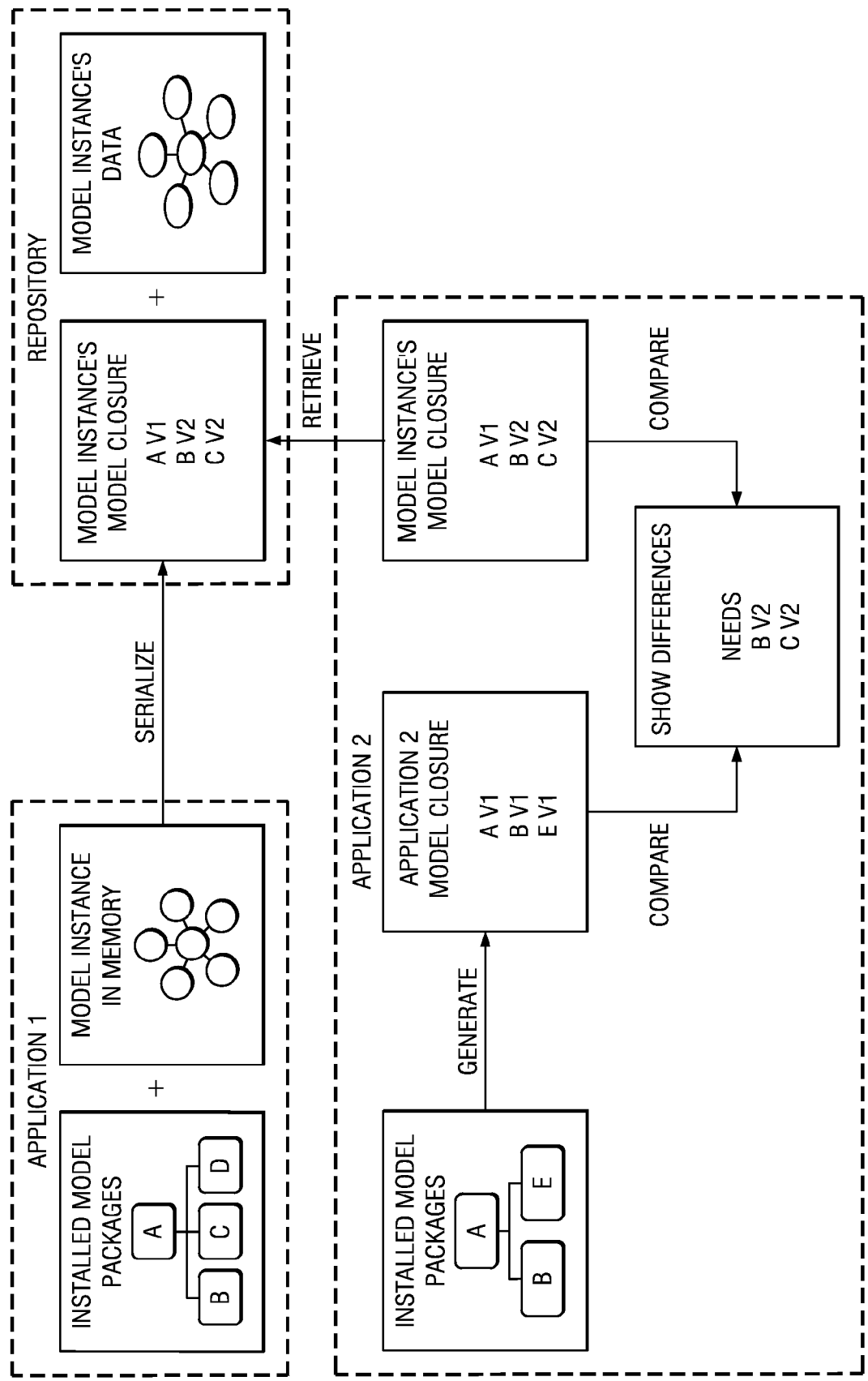
FIG. 5 is a diagram illustrating serialization according to an exemplary embodiment of the application.

An example of serialization and writing out of model instances in memory according to an embodiment of the application is illustrated in FIG. 5. Application 1 may write objects to an external resource, such as a database, a file, an archive, a network, or the like. The objects may be processed to determine which model packages they correspond to, and meta-data may be written, for instance, in the closure. The meta-data may include version numbers for each model that includes the data being written, and the data and closure may both be located in the external resource.

The closure may additionally include instructions at a higher granularity than the written objects written, and may be operable to indicate to applications whether the applications are able to read the data, whether the data must be transformed before reading, whether illegible and/or incompatible data may be ignored, and whether new software may be downloaded to read the data.

Application 2, desiring to read the written data, may first read the closure, and compare the version information of the closure to version information of software loaded by Application 2. In an exemplary embodiment, the serializing performed by Application 2 may include a generation of model closures only for the model instances in memory that are being serialized out, instead of for each of a plurality of model instances of Application 2. Such generation of model closures may thus avoid inefficiencies related to writing meta-data for all models known to the writing application regardless of whether instances of those models are written.

Application 2 may utilize the compatibility policies to determine whether the data can be read, whether transformation of the data is required first, etc. That is, the model closure information is utilized to determine whether Application 2 has a capability of reading the data, and the policies may direct the application in performing additional operations associated with reading the data.

When Application 2 determines that it does not have a capability to read the data, Application 2 may show the meta-data along with its own capabilities and requirements and/or needs to, for instance, a user, so that the user may analyze determined capabilities and incompatibilities. Alternatively, Application 2 may perform one or more activities to obtain and/or enhance compatibility including, for instance, automatically upgrading its capabilities by downloading software from a location described in the meta-data, as described above.

As will be understood by one skilled in the art, the present application is not limited to the precise exemplary embodiments described herein and various changes and modifications may be effected without departing from the spirit or scope of the application. For example, elements and/or features of different illustrative embodiments may be combined with each other, substituted for each other, and/or expanded upon within the scope of the present disclosure and the appended claims. In addition, improvements and modifications which become apparent to persons of ordinary skill in the art after reading the present disclosure and appended drawings are deemed within the spirit and scope of the present application.

What is claimed is:

1. A method for deserializing data by an application, comprising:

determining whether at least one model containing at least one model class instance is known or unknown to the application based upon information contained in a meta-data artifact, the meta-data artifact information including at least one of version information, ignore policy information, or upgrade information associated with the at least one model, wherein the ignore policy information specifies at least whether data associated with the at least one model class instance is required or optional;

determining whether the at least one model is ignorable or non-ignorable by the application, based upon the meta-data artifact information;

when the at least one model is determined to be unknown to the application and the at least one model is determined to be ignorable by the application, marking all references to the at least one model class instance as unresolved;

determining whether the at least one model class instance is convertible or non-convertible to a generic representation, based upon the meta-data artifact information; and when the at least one model is determined to be unknown to the application and the at least one model class instance is determined to be convertible to a generic representation, converting the at least one model class instance to a generic representation;

determining whether the at least one model has a version that is compatible or incompatible with a version of the application, based upon the meta-data artifact information;

determining whether the at least one model class instance is over-writable or non-over-writable, based upon the meta-data artifact information;

when the at least one model is determined to be known to the application, the at least one model is determined to be compatible with a version of the application, and the at least one model class instance is determined to be non-over-writable, marking the at least one model class instance as non-over-writable and deserializing the at least one model class instance.

2. The method of claim 1, further comprising:

determining whether the at least one model class instance is read-only or non-read-only, based upon the meta-data artifact information;

when the at least one model is determined to be known to the application, the at least one model is determined to be compatible with a version of the application, and the at least one model class instance is determined to be read-only, marking the at least one model class instance as non-writable and deserializing the at least one model class instance.

3. The method of claim 2, further comprising:

when the at least one model is determined to be known to the application, the at least one model is determined to be incompatible with a version of the application, and the at least one model class instance is determined to be over-writable or non-read-only, deserializing the at least one model class instance.

4. A method for serializing data by an application, comprising:

identifying at least one model class instance to be written, the at least one model class instance belonging to at least one model;

reading a meta-data artifact, the meta-data artifact containing information including at least one of version information, ignore policy information, or upgrade information associated with the at least one model, wherein the ignore policy information specifies at least whether data associated with the at least one model class instance is required or optional;

determining whether the at least one model class instance is compatible or incompatible with a version of a model used by the application, based upon the meta-data artifact information;

when the at least one model class instance is determined to be compatible with a version of a model used by the application, serializing the at least one model class instance;

when the at least one model class instance is determined to be incompatible with a version of a model used by the application, determining whether the at least one model class instance is updatable or non-updatable based upon the meta-data artifact information;

when the at least one model class instance is determined to be non-updatable, generating an error;

when the at least one model class instance is determined to be updatable, determining whether the at least one model class instance should be replaced or retained; and when the at least one model class instance should be retained, serializing the at least one model class instance to a new location as a copy.

5. The method of claim 4, further comprising:

when the at least one model class instance should be replaced, determining whether the at least one model class instance is replaceable or non-replaceable, based upon the meta-data artifact information;

when the at least one model class instance is replaceable, serializing the at least one model class instance to an original location and overwriting a prior model class instance; and when the at least one model class instance is non-replaceable, generating an error.

\* \* \* \* \*